United States Patent [19]

Kistemaker et al.

[11] 4,156,832

[45] May 29, 1979

[54] GAS VORTEX WITH MHD-DRIVE

[75] Inventors: Jacob Kistemaker, Amsterdam; Maarten S. van den Berg, The Hague, both of Netherlands

[73] Assignee: Ultra Centrifuge Nederland N.V., The Hague, Netherlands

[21] Appl. No.: 772,239

[22] Filed: Feb. 25, 1977

[51] Int. Cl.$^2$ .............................................. H01J 7/24
[52] U.S. Cl. ..................................... 315/111.4; 55/3; 55/100; 176/9
[58] Field of Search ................... 176/1, 3, 2, 8, 9, 39; 233/DIG. 1, DIG. 1 A; 55/100, 135, 3, 17; 315/111.4

[56] References Cited

U.S. PATENT DOCUMENTS

| | | | |
|---|---|---|---|
| 2,533,966 | 12/1950 | Simmons, Jr. | 55/100 |
| 2,939,049 | 5/1960 | Blachman | 176/1 |
| 2,953,718 | 9/1960 | Ducati | 176/1 |
| 2,961,558 | 10/1960 | Luce et al. | 176/2 |
| 3,005,767 | 10/1961 | Boyer et al. | 176/6 |
| 3,214,342 | 10/1965 | Linhart | 176/8 |
| 3,277,631 | 10/1966 | Sonnen | 55/100 |
| 3,363,130 | 1/1968 | Flowers | 176/6 |
| 3,501,376 | 3/1970 | Dow et al. | 176/1 |
| 3,519,942 | 7/1970 | Mobley | 176/1 |
| 4,046,527 | 9/1977 | Kistemaker | 176/1 |

OTHER PUBLICATIONS

Nucleonics, (vol. 21, No. 7, Jul. 1963), pp. 43–47, 176–39.

Primary Examiner—Samuel W. Engle
Assistant Examiner—S. A. Cangialosi
Attorney, Agent, or Firm—Cushman, Darby & Cushman

[57] ABSTRACT

Apparatus wherein a partially ionized mass of gas is enclosed by a rotationally symmetric, axially elongate housing and set in rotation by a force which arises as a result of a substantially axial magnetic field constant in time and an electric current having a non-zero vector component in the radial direction, whereby positively charged ions originating from a centralized axial gas discharge arc region and moving at a high speed of rotation set the whole mass of gas in rotation by pulse transfer, said housing being lined on the inside with annular wall electrodes segmented in non-azimuthal direction and arranged against each other; the inside wall of said housing at an extremity thereof curving toward the center axis and approaching a centrally mounted electrode of opposite polarity, the wall electrodes being connected with variable resistors which are adjusted so that the voltage applied to the wall electrodes increases blockwise from a minimum value at a chosen point on the axis of the housing to the grid-or anode voltage of the said axial gas discharge arc region, whereby the wall electrode which is closest to the central electrode exhibits with respect thereto the smallest potential difference of all the wall electrodes, in an extreme case the potential difference being zero.

6 Claims, 2 Drawing Figures

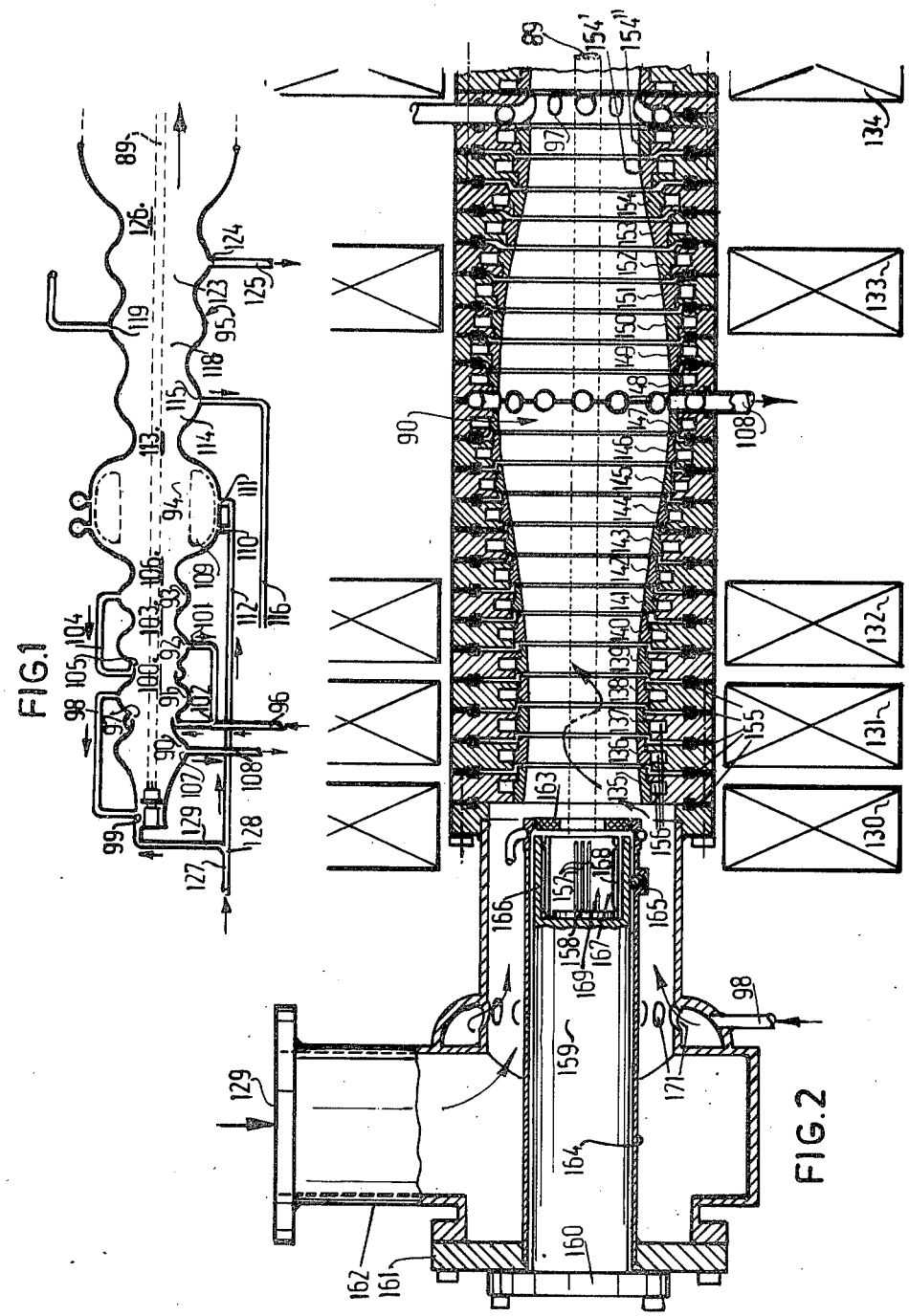

GAS VORTEX WITH MHD-DRIVE

The application relates to a reactor wherein a partially ionized mass of gas is enclosed by a rotationally symmetric, axially elongate housing and set in rotation by a force which arises as a result of a substantially axial magnetic field constant in time and an electric current having a non-zero vector component in the radial direction, whereby positively charged ions originating from an axial gas discharge arc and moving at a high speed of rotation set the whole mass of gas in rotation by impulse transfer. Such an apparatus is known from DAS 1,259,603. This apparatus has, however, various disadvantages. First of all, concentrations of electric current occur in consequence of the Hall effect in the edges of the segmented electrodes lying upstream with respect to the motion of the medium so that local burn-in can occur in the electrode material. Secondly, the system is so slender that, as a result of the presence of stationary vertical end walls acting as covers closing the cylindrical system, vortices can develop with strong axial components. These axial vortex components are perpendicular to the main tangential vortex and disturb its function seriously. Thirdly, the lack of a magnetic bottle field will result in a minimum confinement of the generated plasma.

According to the invention, these difficulties are avoided. The concentrations of electric current, mentioned above, will not occur because no use is made of electrodes segmented in azimuthal direction, and the spoke formation mentioned in DAS 1,259,603 will not take place since the radial electric current is not the result of a radial gas discharge but rather that of ion extraction from an axial gas discharge. The housing of circular cross section consists in addition of annular electrode segments insulated from each other in axial direction, which henceforth will be referred to as wall electrodes and to each of which a suitable voltage can be applied with respect to the axial gas discharge arc, e.g. with the aid of variable resistors.

The voltage of these wall electrodes increases blockwise from a minimum value at a chosen point on the axis of the housing to the grid- or anode voltage of the axial gas discharge section. Such an axial gas discharge section is situated in at least one end of the housing and consists of a cathode at a voltage negative with respect to the grid or anode, with associated tubular holder, and an anode or grid with an equally tubular grid- or anode holder enveloping the cathode structure. The cathode, which henceforth will be referred to as axial cathode, can best be made in the shape of a bundle of hollow cathode tubules joined at one end to form an electrode holder.

A first advantage of the structure described above is that the occurence of trochoidal gas discharges between the grid- or anode structure can be fully counteracted because the last wall electrode together with the adjacent housing portion enveloping the grid- or anode structure are at the same voltage as the latter. The last wall electrode together with the corresponding housing portion can then be electrically connected directly with the grid- or anode structure.

The second advantage of the possibility to set up a housing wall potential pattern is that the flow of the partially ionized medium can be controlled by varying the voltage applied to said wall electrodes. The gas-dynamic properties of the flow can thereby be influenced in such a manner that undesirable secondary flows with velocity components normal to those of the azimuthal main flow can be reduced, while the electromagnetic drive of the medium in the bottleneck constriction adjacent the axial gas discharge sections can also be influenced.

The afore-mentioned magnet field, in the main axial and constant in time, exhibits a bottle shape at the place of the housing ends where this is considered necessary. As a result, both the axial and the centrifugal confinement of the charged plasma particles is promoted. The housing wall consisting of wall electrodes is then executed so that it follows the lines of magnetic force throughout and thus simultaneously takes care of the centrifugal confinement of the neutral components of the partially ionized gas.

To start the axial arc, an axially adjustable needle-shaped starting electrode can be mounted in the axial cathode. To prevent the gas discharge from being extinguished by too great a loss of energy owing to radiation, care is taken to surround the afore-said hollow cathode tubules lying in the axis with a cylindrical extension of the axial cathode holder brought to a voltage negative with respect to the grid or anode, which extension is lined on the inside with a number of coaxial radiation shields.

Such a reactor can be used for separating the components of a gaseous mixture, e.g. gaseous isotopes, but also for reprocessing or separating gaseous fission products or for maintaining a reaction based on nuclear fission. Finally, the reactor can likewise be used for maintaining thermonuclear reactions, in systems described in Dutch Patent Application 73-02102 filed earlier.

An embodiment of the invention will now be described with the aid for the following drawings. These represent:

FIG. 1—a schematic longitudinal sectional view of a gas-core nuclear reactor preceded by an enrichment section and followed by a reprocessing section;

FIG. 2—a detailed illustration of the inlet portion of the enrichment section shown schematically in FIG. 1.

FIG. 1 shows a schematic longitudinal sectional view of a gas-core nuclear reactor preceded by an enrichment section and followed by a reprocessing section. The enrichment section consists here of four zones, 90, 91, 92 and 93, wherein an enriched or depleted $UF_6$ gas mixture can be separated time and again in such a manner that the separated components are fed, as in a cascade, to other parts of the enrichment section where the same degree of enrichment prevails. In addition, 94 represents the nuclear reactor and 95 the reprocessing section.

The $UF_6$ to be enriched is fed in through the supply conduit 96 and is then fed to the separation space of stage 91 through the peripheral row of inlet openings 97. As a result of the rapid rotation of gas in this chamber, the gaseous mixture is separated into light and heavy components. The heavy component is discharged at the largest diameter of this stage through conduit 98, which feeds it to the inlet openings 99 in the separation space of stage 90. The light component separated in stage 91 flows on through opening 100 to the separation space of stage 92. The heavy component is separated herein at the largest diameter of this chamber and is discharged through conduit 101 which joins the supply conduit 96 at point 102. The light gaseous components from chamber 92 are transported further through opening 103 to the separation space of stage 93.

In this stage, the heavy components are discharged at the largest diameter of this separation chamber through conduit 104, which feeds this gaseous product back to the peripheral row of openings 105 at the inlet of stage 92. The light gaseous components coming from stage 93 are fed through opening 106 to the space 94 wherein the nuclear neutron reaction takes place. The depleted $UF_6$ is discharged from the separation space of stage 90 at the greatest diameter at 107 through conduit 108.

The $UF_6$ enriched in the stages 90, 91, 92 and 93 arrives finally in the reaction space 94 of the nuclear neutron reactor. Due to the considerably faster rotation of the gas mass in this chamber, the enriched $UF_6$ which accumulates in zone 109 at the largest diameter of this chamber is compressed to such a degree that a uranium density develops sufficient to initiate a fission reaction. For the sake of simplicity, the neutron reflector which is necessary for this purpose and is placed around the vessel 94 is not illustrated here; neither are, for that matter, the annular wall electrodes which are present over the whole length of the system and the magnet coils which produce the magnetic field.

Light gasses supplied through conduit 112 are injected into the reaction chamber through openings 110 and 111. The inner wall of chamber 94 is cooled by a gaseous medium (not indicated). For the sake of simplicity, liquid cooling is not illustrated but can be used.

Mainly the lighter gases from chamber 94 are discharged through opening 113 into the first separation chamber 114 of the reprocessing section 95. The heaviest gaseous products are separated in this chamber at the largest diameter of the rotating gas vortex through opening 115. These heaviest gaseous products consist in part of $UF_6$ and are therefore fed back through conduit 116 to a junction point of appropriate concentration in the enrichment cascade. The heavy gaseous fission products from the next separation space 118 can be discharged through openings 119 at the largest diameter of this chamber. The lighter fission products are finally drained off from the separation chamber 123 at its largest diameter through opening 124 so that they can be discharged via conduit 125 into a collecting space not illustrated here. The remaining light gases are finally discharged through opening 126; they can be used to generate energy in an MHD-system or in a gas turbine, they can be fed back to the light-gas inlet conduit 127, or can be used for propulsion purposes. Part of the light gases is branched off from conduit 127 at point 128 to be fed through conduit 129 to the inlet of the enrichment section.

FIG. 2 shows the inlet portion of the enrichment section of FIG. 1 in greater detail. The electromagnet coils required are designated in this drawing by references 130 to 134. The magnetic flux of all these coils points in the same direction. Inside the magnet coils there are electrode rings 135 to 154, 154' and 154''. These rings are electrically insulated from each other by insulators 155. Each electrode ring is provided at the same time with a cooling channel 156 for removing the generated heat. A discharge conduit 108 is connected between the electrode rings 147 and 148 for discharging depleted $UF_6$. The peripheral row of openings 97 for admitting the $UF_6$ to be enriched is situated between the electrode rings 153 and 154 (see FIG. 1).

The gas discharge column 89 in the middle of the gas vortex inside chamber 90 is maintained by electron emission originating from the cathode bundle 157 mounted in an electrode holder 158. This electrode holder is attached to a tube 159 which is affixed by means of a flange 160 to a flange 161 made of electrically insulating material. This flange serves, on the one hand, as seal to make the housing vacuum-tight, on the other hand for supporting a tube portion 164 which sustains the grid 163, centered relative to the tube 159 by means of a number of insulating balls 165.

The electrode-bundle 157 is surrounded by a cylinder 166, lined on the inside with a few radiation shields 167 and 168. A needle-shaped electrode 169 serves for starting the gas discharge. The heavy gases are supplied through inlet conduit 129 (see FIG. 1). These gases are mixed with light gases entering through openings 171 (corresponding to opening 99 in FIG. 1) and are then fed to the separation chamber 90 through the opening between the end of the tube 164 and the wall electrode 135.

The voltage applied to the individual wall electrodes insulated from each other differs according to the required aim depending on the task of the different chambers. That is, the voltage applied to the mutually insulated electrode rings increases gradually, beginning with a lowest voltage applied to the electrode ring (not illustrated) lying at the extreme end of the system opposite the cathode bundle 157. The electrode ring with the lowest voltage can, for example, be grounded. Of all the electrode rings, electrode ring 135 is at the highest voltage. A practically equal voltage is applied to grid 163. The cathode 157 and the tube 159 connected with it are at a negative voltage suited for the gas discharge. If necessary, an additional thin layer of insulating material can be inserted between the parts 159 and 164.

We claim:

1. Apparatus wherein a partially ionized mass of gas is enclosed by a rotationally symmetric, axially elongate housing and set in rotation by a force which arises as a result of a substantially axial magnetic field constant in time and an electric current having a non-zero vector component in the radial direction, whereby positively charged ions originating from a centralized axial gas discharge arc region and moving at a high speed of rotation set the whole mass of gas in rotation by pulse transfer, said housing being lined on the inside with annular wall electrodes segmented in non-azimuthal direction and arranged against each other; the inside wall of said housing at an extremity thereof curving toward the center axis and approaching a centrally mounted electrode of opposite polarity, the wall electrodes being connected with variable resistors which are adjusted so that the voltage applied to the wall electrodes increases blockwise from a minimum value at a chosen point on the axis of the housing to the grid- or anode voltage of the said axial gas discharge arc region, whereby the wall electrode which is closest to the central electrode exhibits with respect thereto the smallest potential difference of all the wall electrodes, in an extreme case the potential difference being zero.

2. Apparatus according to claim 1 in which at least one grid anode ring which serves as neck electrode is placed in front of a central electrode formed as cathode, the grid-anode ring forming via an enveloping tube-shaped holder, a mechanically integral part with the central electrode, the central electrode being attached to at least one end of the housing and consisting of a bundle of hollow cathode tubules joined together at one end to form an electrode holder.

3. Apparatus according to claim 2, in which the hollow cathode tubules are surrounded by a cylindrical extension of the axial cathode holder adjusted to a voltage negative with respect to the grid or anode, the extension being lined on the inside with a number of coaxial radiation shields.

4. Apparatus according to claim 1 including means for gradually increasing the voltage applied to the electrode segments from zero in the homogeneous portion of the tube to the voltage necessary to maintain the required speed of rotation of the partially ionized medium.

5. Apparatus according to claim 4 including means for controlling the axial gas discharge arc by varying the voltage of the central cathode.

6. Apparatus according to claim 2 wherein an axially adjustable needle-point starting electrode is likewise mounted in the electrode holder.

* * * * *